(12) United States Patent
Lemmen et al.

(10) Patent No.: US 12,006,166 B2
(45) Date of Patent: Jun. 11, 2024

(54) DEVICE FOR DISCHARGING MUSHROOMS FROM A CONVEYOR

(71) Applicants: Jacobus Alexander Jozef Lemmen, Venlo (NL); Marcus Gerardus Maria Van Doremaele, Velddriel (NL)

(72) Inventors: Jacobus Alexander Jozef Lemmen, Venlo (NL); Marcus Gerardus Maria Van Doremaele, Velddriel (NL)

( * ) Notice: Subject to any disclaimer, the term of this patent is extended or adjusted under 35 U.S.C. 154(b) by 0 days.

(21) Appl. No.: 18/274,515

(22) PCT Filed: Feb. 7, 2022

(86) PCT No.: PCT/EP2022/052923
§ 371 (c)(1),
(2) Date: Jul. 27, 2023

(87) PCT Pub. No.: WO2022/167670
PCT Pub. Date: Aug. 11, 2022

(65) Prior Publication Data
US 2024/0034574 A1   Feb. 1, 2024

(30) Foreign Application Priority Data
Feb. 8, 2021  (NL) ..................................... 2027518

(51) Int. Cl.
*B65G 47/94*    (2006.01)
*A01G 18/80*    (2018.01)
(Continued)

(52) U.S. Cl.
CPC ........... *B65G 47/945* (2013.01); *A01G 18/80* (2018.02); *B65G 21/10* (2013.01); *A01G 18/70* (2018.02); *B65G 2201/0202* (2013.01)

(58) Field of Classification Search
CPC .................. B65G 21/10; B65G 47/945; B65G 2201/0211; A01G 18/60; A01G 18/70; A01G 18/80
See application file for complete search history.

(56) References Cited

U.S. PATENT DOCUMENTS

| 2,902,143 A | * | 9/1959 | Sundin ................. B65G 47/945 198/839 |
| 4,461,378 A | | 7/1984 | Roth |

(Continued)

FOREIGN PATENT DOCUMENTS

| DE | 3910230 C1 | 1/1990 |
| EP | 3673726 A1 | 7/2020 |
| EP | 3815518 A2 | 5/2021 |

OTHER PUBLICATIONS

International Search Report and Written Opinion dated May 13, 2022, from International Patent Application No. PCT/EP2022/052923, 9 sheets.
(Continued)

*Primary Examiner* — Gene O Crawford
*Assistant Examiner* — Keith R Campbell
(74) *Attorney, Agent, or Firm* — KATTEN MUCHIN ROSENMAN LLP

(57) ABSTRACT

The present invention relates to a device for discharging mushrooms from a conveyor, comprising a mushroom conveyor, in particular a conveyor belt and/or an endless conveyor, for conveying the mushrooms in a direction of conveyance; wherein the mushroom conveyor has a surface for carrying the mushrooms; and the mushroom conveyor being guided along a trajectory from a charging location such as a picking location to a discharging location, such as a filling station for mushroom containers, as well as a twister, located at the discharging location, for at least (Continued)

locally twisting a plane in which the surface of the mushroom conveyor lies.

12 Claims, 5 Drawing Sheets

(51) Int. Cl.
    *B65G 21/10*     (2006.01)
    *A01G 18/70*     (2018.01)

(56)     References Cited

U.S. PATENT DOCUMENTS

| | | | | |
|---|---|---|---|---|
| 6,827,198 | B1 * | 12/2004 | Costanzo | B65G 47/945 |
| | | | | 198/779 |
| 10,118,765 | B2 * | 11/2018 | Ragan | B65G 15/60 |
| 11,582,921 | B2 * | 2/2023 | Lemmen | A01G 18/69 |
| 2007/0235292 | A1 * | 10/2007 | Messenger | B65G 15/42 |
| | | | | 198/818 |

OTHER PUBLICATIONS

International Preliminary Report on Patentability dated Apr. 25, 2023, from International Patent Application No. PCT/EP2022/052923, 6 sheets.

\* cited by examiner

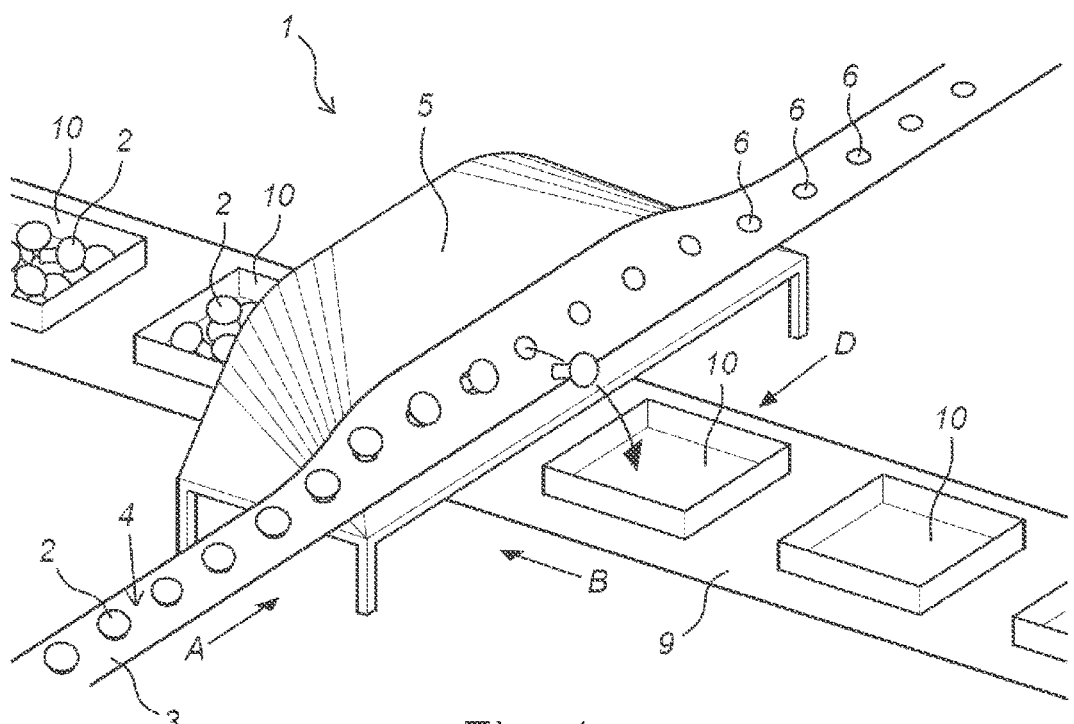
Fig. 1a
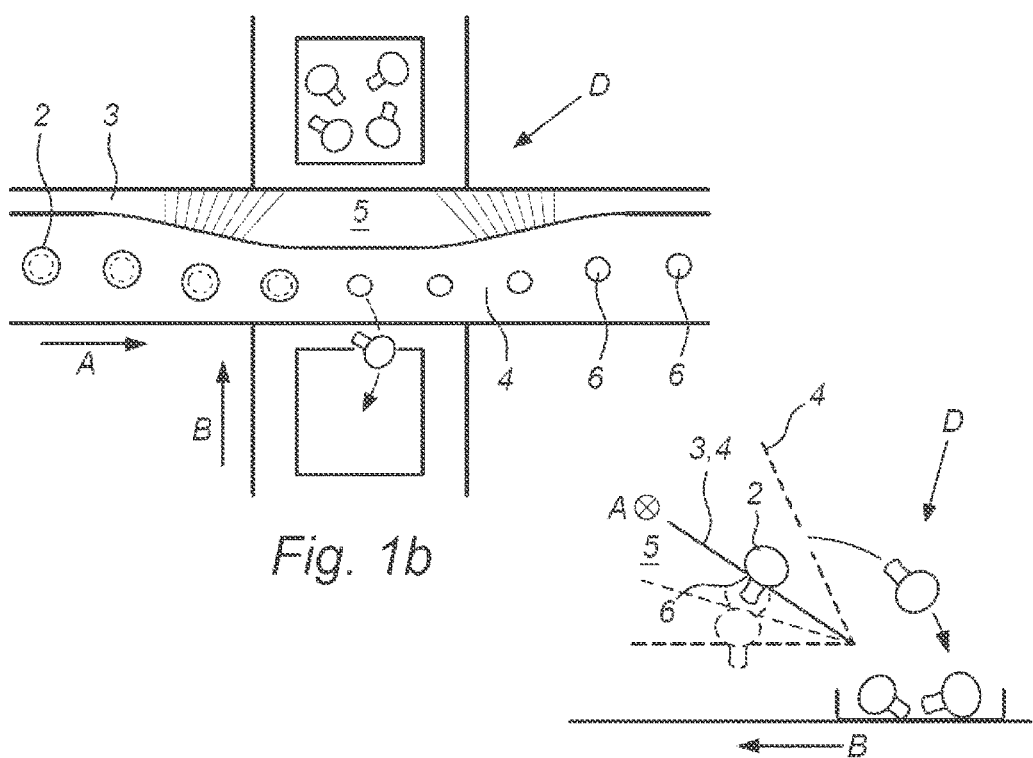
Fig. 1b
Fig. 1c

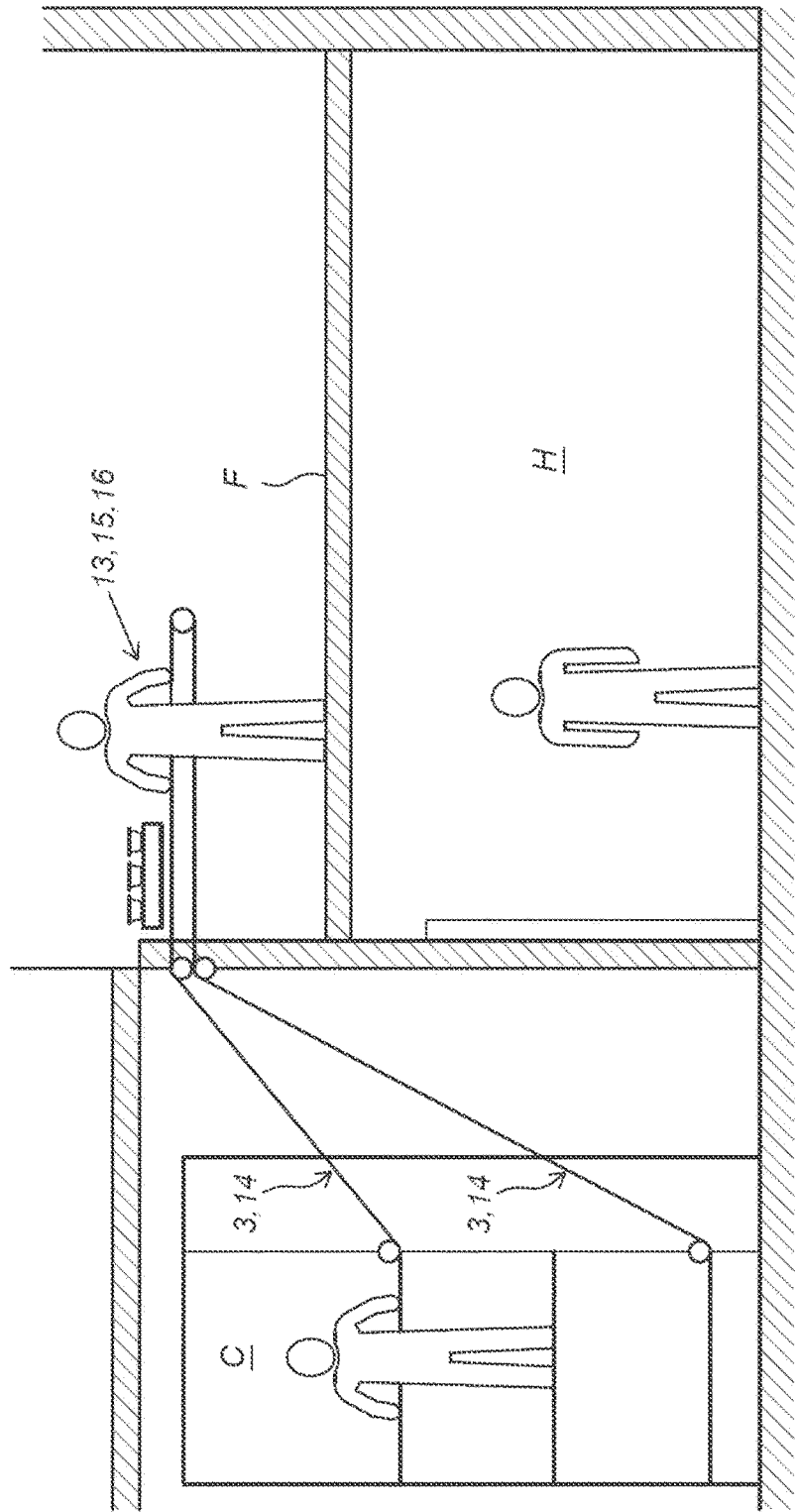

DEVICE FOR DISCHARGING MUSHROOMS FROM A CONVEYOR

CROSS REFERENCE TO RELATED APPLICATIONS

This application is a National Stage Application of International Application No. PCT/EP2022/052923, filed on Feb. 7, 2022, which claims priority of Dutch (NL) Patent Application No. 2027518, filed on Feb. 8, 2021 in the Dutch Patent Office, which are incorporated herein by reference in their entirety.

The present invention relates to a device for discharging mushrooms from a conveyor.

Mushrooms are grown in beds with compost and casing soil, that are suspended in shelvings, often in multiple layers on top of each other. The mushrooms are picked from there and transported to a packaging location by means of a harvesting belt or harvesting conveyor. From that conveyor, they need to be transferred to containers, in which they are transported and/or finally sold.

Transferring mushrooms from the harvesting belt to a container is a precious step, because the mushrooms are easily damaged, and when handled too rough, they may decolour, and become less valuable or even unsuitable for sales.

Device for discharging mushrooms from a conveyor exist, for instance as described in the European Patent Application EP 20204982 from the same applicant. However, this system has the disadvantage that discharging can only take place at a far end of a harvesting conveyor, and the construction requires further technical measures to reduce a falling height of the mushrooms, which needs to be as small as possible. For that reason, there appeared to be room for further improvement.

It is therefore a goal of the present invention to provide a device for discharging mushrooms from a conveyor that takes away the disadvantages of the prior art.

The invention thereto proposes a mushroom conveyor, in particular a conveyor belt and/or an endless conveyor, for conveying the mushrooms in a direction of conveyance wherein the mushroom conveyor has a surface for carrying the mushrooms; and the mushroom conveyor being guided a trajectory from a charging location such as a picking location to a discharging location, such as a filling station for mushroom containers, further comprising a twister, located at the discharging location, for at least locally twisting a plane in which the surface of the mushroom conveyor lies. The twisting takes preferably place such that the mushrooms are discharged at a side of the conveyor, wherein the side is next to the conveyor, that is, in a direction perpendicular to the direction of conveyance.

In order to meet food-grade requirements, the conveyor is preferably made of one piece, that is, a flexible material. More preferably it is free of interconnected parts and in particular it does not comprise hinges or links.

In order to be able to follow the ramp and more in particular to be twisted. Twisting means, unlike (simple) bending, undergoing a double curvature, that is a bend in two directions perpendicular to each other. The material should therefore preferably be flexible both in a direction of conveyance and a direction perpendicular thereto. However, it should hardly or not be stretched of stretchable at least in the direction of conveyance.

Normally, the plane on which the mushrooms are conveyed is an essentially horizontal plane. The trajectory the mushroom conveyor follows may comprise uphill or downhill parts, but normally never be so steep that the mushrooms may fall off the conveyor, or move on the conveyor. Normally, when uphill or downhill trajectories are considered necessary, a mushroom conveyor with holes for mushroom stipes, more in particular holes at a regular distance from each other in the direction of conveyance may be used.

In a preferred embodiment, the twister is configured to twist the mushroom conveyor about an axis parallel to direction of conveyance. This axis may coincide with the centre or a side of the mushroom conveyor. Twisting about the direction of conveyance has the advantage that a minimal falling distance can be obtained. The choice for the exact position of the axis about which the conveyor is twisted may depend on available space and further technical design choices.

In a practical realisation, the twister comprises a ramp for guiding the mushroom conveyor. The ramp defines the position where the twisting starts, the distance over which it takes place, that maximum angle, and whether the ramp extends over a full width of the mushroom conveyor. Such ramp may be adjustable, in particular the angle wherein the ramp twists the conveyor may be adjustable, and/or the ramp may be a physical object that is exchangeable with a ramp with different dimensions, such as a different angle or length.

In a preferred embodiment, the ramp is displaceable in and against the direction of conveyance of the belt, in order to be able to change the position wherein the mushrooms are discharged. In a further embodiment, the position is automatically movable, in use, that is when the conveyor is moving. In yet a further embodiment, the position is automatically driven forward and back to discharge mushrooms over a distance along the path of the conveyor. This allows to evenly fill containers passing the discharge location.

In an embodiment where the mushroom conveyor has holes for mushroom stipes, a larger angle may be required than in those cases where it hasn't. The ramp may have a different height at the area where it supports the part of the mushroom conveyor that comprises the holes, or differently stated, there may be a slot in at least part of the ramp to allow mushroom stems to pass.

In a further embodiment, the mushroom conveyor comprises multiple parallel lanes of holes, for conveying multiple lanes, such as two or three or four or five lanes of mushrooms in parallel.

Twisting of the conveyer belt may then be done such that only a part of the conveyor belt is twisted, in order to discharge only mushrooms of one or more specific lanes.

There may be multiple discharging locations behind each other downstream the direction of conveyance. The belt may be twisted in different ways at different locations, in order to discharge mushrooms from different lanes at those locations.

There may be a bend in the mushroom conveyor at the height of a or one of the discharge stations, which bend allows only part of the mushroom conveyor in the direction perpendicular to the direction of conveyance to be bent.

Alternatively the ramp supports the mushroom conveyor over its entire width and acts as a pusher to push the mushroom out of a hole in the conveyor. In such case, the twister may also comprise a pusher conveyor belt, which is positioned under the surface of the mushroom conveyor belt, for pushing the mushroom stipes through the holes of the mushroom conveyor at the discharging location. A belt has the advantage that there is no friction between the pusher and the mushroom, which may have positive effect on the mushroom condition.

Alternative embodiments for this pusher may be applied in all embodiments described here. The pusher may be a belt, but also contactless options such as pushing mushrooms out of the holes with air pressure or even air under pressure such as vacuum are thinkable.

The device as described above may be combined with a filling station for mushroom containers, such as trays, wherein the filling station comprises a container means such as a conveyor for providing mushroom containers, wherein the container conveyor conveys the containers to a location below the twister, for catching mushrooms discharged from the mushroom conveyor. The container conveyor may preferably pass underneath the mushroom conveyor at the smallest possible distance, in order to minimize the falling distance of the mushroom.

The conveyor may provide various and/or mutually different containers.

Embodiments are also thinkable, comprising multiple means, and in particular multiple container conveyors, at a mutual distance in the transport direction. These different conveyors then lead to different filling stations at various positions at the mushroom conveyor.

The twisters and/or the pushers may in particular in those cases be controllable, such that mushrooms can be selectively removed from the mushroom conveyor at one filling station, while already having passed another filling station upstream. Such selection may be done based on mushroom properties such as size and weight, which may be measured or otherwise determined at an upstream location.

The container conveyor may preferably be configured for conveying the containers such that a bottom plane of the conveyors is under an angle with the horizontal plane. By having the containers tilted at the moment of filling, and more in particular by moving them simultaneously, the mushrooms are deposited adjacently to each other in the containers, which reduces the falling distance even further.

For that purpose, in a preferred embodiment, the container conveyor is configured for moving the container with at least a directional component, or in a direction perpendicular to the direction of conveyance while catching mushrooms discharged from the mushroom conveyor. However, a movement of containers parallel to the mushroom conveyor is also thinkable.

The container conveyor may for instance extend from a destacker location where containers are destacked from a stack, onto the container conveyor, to a buffer location, where containers are stored for buffering. In such configuration, the device for discharging the mushrooms may be configured to discharge an amount or weight or volume of mushrooms to the container, that is less than a desired amount to fill the container with. The last part of the filling can then be done manually, or by means of a robot or similar device that is configured for placing the mushrooms in a specific orientation as a top layer in the container.

Such configuration may comprise a second or further mushroom conveyor, extending from a second picking location to the buffer location. The mushrooms from the second conveyor may then be used to top-up the containers filled with second mushroom conveyor may be used to top up the containers filled with mushrooms from the first mushroom conveyor. Here, specific care may be taken that the mushrooms in the top layer are oriented in a neat and presentable way, which is normally with their caps up and stipes down. The buffer location may also comprise a check weigher, to make sure the containers are filled with the correct weight.

The invention also relates to a method for harvesting and packaging mushrooms, comprising one or more of the steps of:

Growing the mushrooms in cells;

Harvesting the mushrooms either manually or with the aid of tooling such as a robot or a combination thereof;

Transporting the harvested mushrooms, in particular out of the cells with a harvesting conveyor;

Transferring the harvested mushrooms from the harvesting conveyor to a container, in particular at least partly in the way described above; and more in particular at least partly, such as up to 75% automatically and partly manually;

Cooling the mushrooms and the containers, and transport them for further handling, wherein further handling in particular comprises further packaging such as covering the package.

The invention also relates to a conveyor for mushrooms and/or mushroom packages, wherein an area closely (that is: less than 50 cm around and in particular about 15 cm around the conveyor) surrounding the conveyor is shielded and the area between the shielding and the conveyor is cooled.

The invention will now be elucidated into more detail with reference to the following figures.

FIGS. 1a-e provide various views of a device according to the invention;

FIG. 5 shows a second schematic lay-out of a combination according to the invention.

Figure 1D:
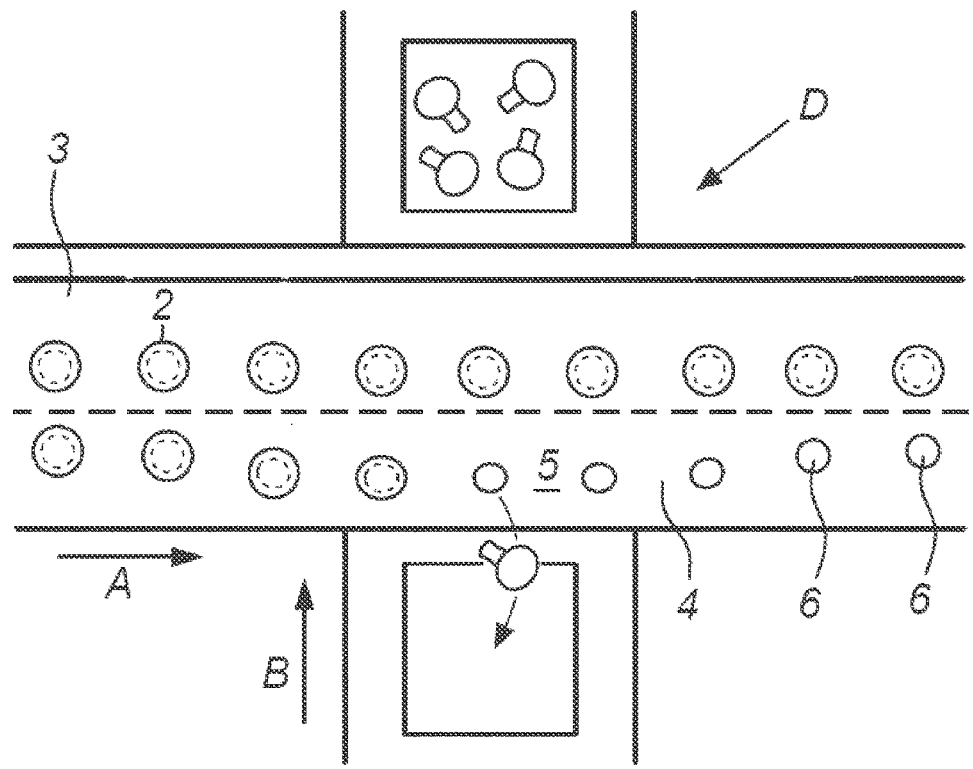

FIGS. 1a-c provide various views of a device 1 for discharging mushrooms 2 from a mushroom conveyor 3, formed by a belt and conveying the mushrooms 3 in a direction of conveyance A, wherein the mushroom conveyor 3 has a surface 4 for carrying the mushrooms 2; and the mushroom conveyor being guided along a trajectory from a charging location such as a picking location (not shown) to a discharging location D, further comprising a twister 5 located at the discharging location D, for at least locally twisting a plane in which the surface 4 of the mushroom conveyor lies.

The twister 5 is configured to twist the mushroom conveyor 3 about an axis parallel to direction of conveyance A. In the depicted case, said axis coincides with a side of the mushroom conveyor 3. The twister 5 comprises a ramp for guiding the mushroom conveyor, wherein the ramp extends over a full width of the mushroom conveyor. In the drawing, it even exceeds the width, although this is not a necessary feature. The twisting takes place over such angle that the mushrooms 2 fall off the mushroom conveyor 3.

The twister 5 may be movable in or against the direction of conveyance A to change the discharge location and it may be movable or against the direction B to (temporarily) disable the discharging. These movements may be controllable and automated. Multiple twisters may be present in order to create multiple discharge locations.

In the embodiment shown, the mushroom conveyor 3 has holes 6 for mushroom stipes, at a regular distance from each other in the direction of conveyance A. In the embodiment shown, the ramp supports the mushroom conveyor fully. As such, it also pushes the mushroom stipes out of their holes 2, and helps to discharge the mushrooms. However a different height at the area where it supports the part of the mushroom conveyor that comprises the holes is thinkable, especially in those cases where the stipes are fragile and friction is to be avoided. Also visible is a container conveyor 9 for providing mushroom containers 10, wherein the container conveyor 9 conveys the containers in a direction B to a location below the twister 5, for catching mushrooms 2 discharged from the mushroom conveyor 3.

Figure 1E:
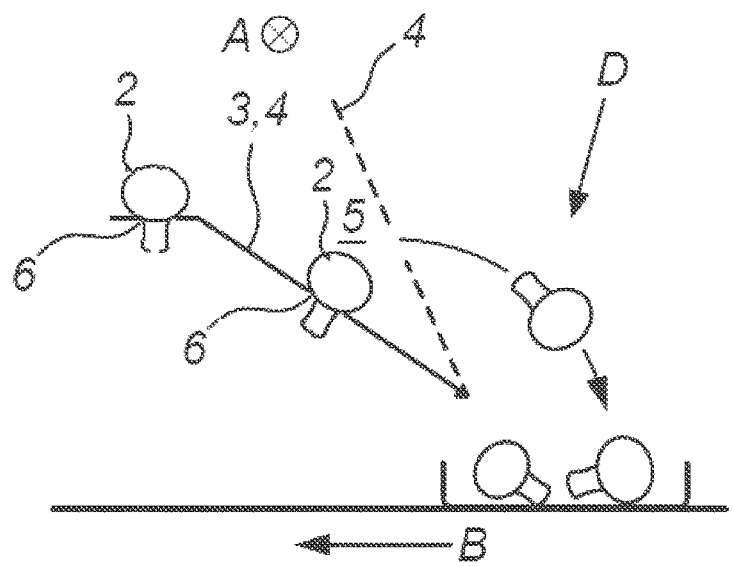

FIGS. 1*d* and 1*e* show a slightly different embodiment, wherein the mushroom conveyor 3 comprises a double row of holes 6 for mushrooms 2. Only a part of the conveyor 3 is tilted (below the dashed line in FIG. 1*d*). As a result, only the mushrooms in one row are discharged.

Figure 2:
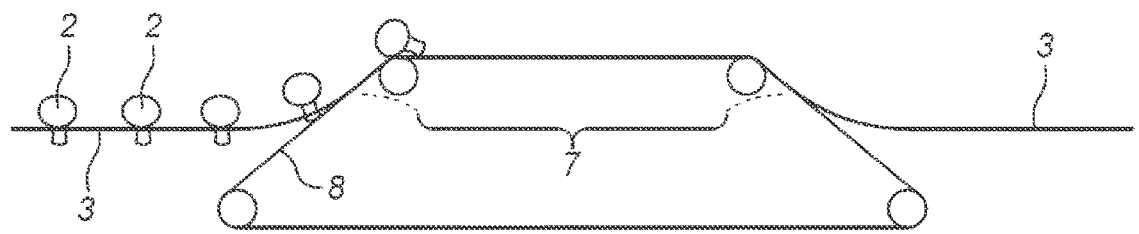
FIG. 2 shows a schematic model of a device.

FIG. 2 shows a schematic model of a device suitable for the above mentioned situation, wherein the twister comprises a pusher conveyor belt 8, which is positioned under the surface of the mushroom conveyor belt 3, for pushing the mushroom 3 stipes through the holes of the mushroom conveyor 2 at the discharging location. Not visible in this view, but also here the mushroom conveyor is locally twisted in the area 7. In general, in a width direction, it may only be required to have the pusher conveyor belt extend over the width of the holes in the mushroom conveyor 2, although it may also extend over the entire width of the mushroom conveyor 2 or more.

Figure 3:
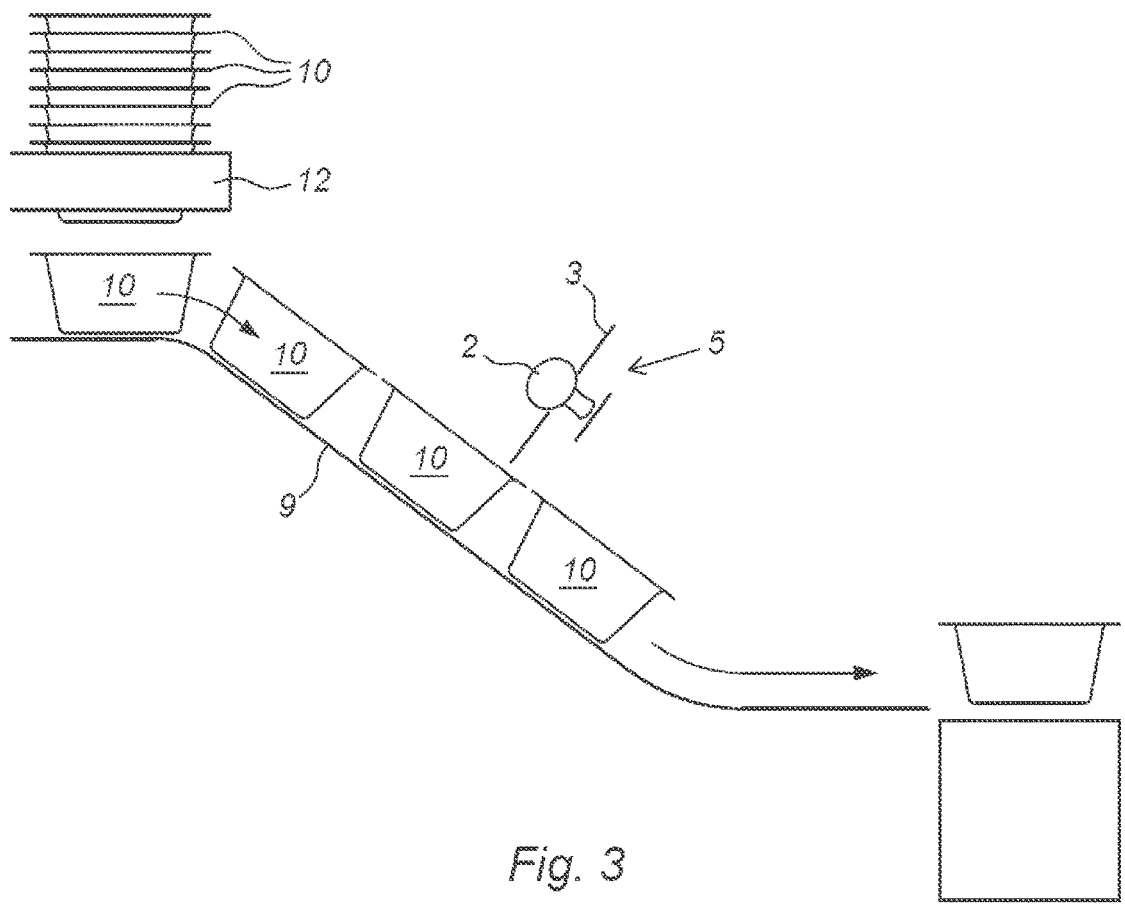
FIG. 3 shows a schematic model of a detail of a device according to the invention.

FIG. 3 shows a combination of a discharging device as described above, and a filling station for mushroom containers 10, such as trays, wherein the filling station comprises a container conveyor 9 for providing mushroom containers 10, wherein the container conveyor conveys the containers to a location below the twister 5, for catching mushrooms discharged from the mushroom conveyor 3. As visible, the container conveyor 9 is configured for conveying the containers such that a bottom plane of the containers 10 is under an angle with the horizontal plane. The container conveyor is also configured for moving the containers 10 with at least a directional component, or in a direction B perpendicular to the direction of conveyance while catching mushrooms discharged from the mushroom conveyor.

The container conveyor 9 extends from a destacker location 12 where containers 10 are destacked onto a location for further processing the mushrooms 2.

Figure 4:
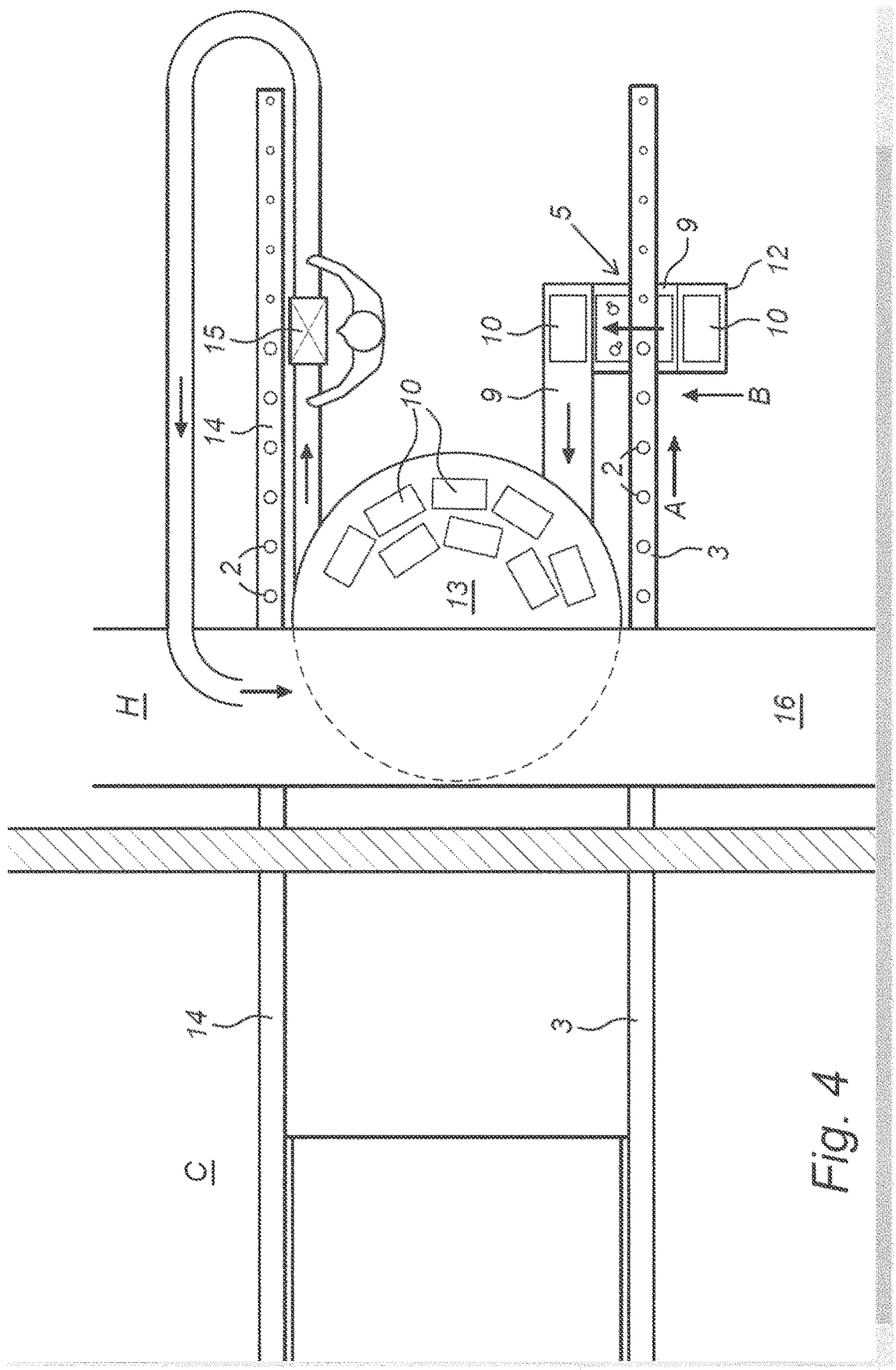
FIG. 4 shows a first schematic lay-out of a combination according to the invention.

FIG. 4 shows a first schematic lay-out of a combination according to the invention. FIG. 4 shows that this location may be a buffer 13 location, where containers 10 are stored for buffering, once filled with mushrooms 2 from mushroom conveyor 3. The embodiment comprises a second mushroom conveyor 14, extending from a second picking location in the growing cell C to the buffer location. The buffer 13 location comprises a check weigher 15, for either personnel or a robot in order to control the weight of the filled containers 10. The buffer 13 enables to fill containers with picked/harvested mushrooms from two mushroom belts and allows to have different picking speeds onto those conveyors 3, 14. The mushrooms may be transferred to a central conveyor, which follows a track along multiple cells C for growing mushrooms.

FIG. 5 shows a second schematic lay-out of a combination according to the invention. FIG. 5 shows a cell C for growing mushrooms, and an adjacent hall H, which is adjacent to multiple cells C. From the cells, harvesting belts 3, 14 extend, which are lead to a level above a floor F, which forms a ceiling of the hall H. At this floor, the buffer 13, check weigher 15 and central conveyor 16 may be arranged. Especially when mushrooms are grown in shelvings that are at multiple levels on top of each other, high cells may be required, and an optimal use of the high halls or corridors H that follow is obtained this way.

The invention claimed is:

1. A device for discharging mushrooms from a conveyor, comprising:

a mushroom conveyor, comprising a conveyor belt and/or an endless conveyor, for conveying the mushrooms in a direction of conveyance; wherein the mushroom conveyor has a surface for carrying the mushrooms; and the mushroom conveyor being guided along a trajectory from a charging location including a picking location to a discharging location including a filling station for mushroom containers;

a twister, located at the discharging location, for at least locally twisting a plane in which the surface of the mushroom conveyor lies, such that the mushrooms are discharged at a side of the conveyor, wherein the side is next to the conveyor, that is, in a direction perpendicular to the direction of conveyance;

the twister comprises a ramp for guiding the mushroom conveyor, wherein the ramp extends over a full width of the mushroom conveyor;

the mushroom conveyor has holes for mushroom stipes, at a regular distance from each other in the direction of conveyance;

wherein the ramp has a different height at the area where it supports the part of the mushroom conveyor that comprises the holes; and wherein:

the twister comprises:
  a pusher conveyor belt which is positioned under the surface of the mushroom conveyor belt, for pushing the mushroom stipes through the holes of the mushroom conveyor at the discharging location; or
  an alternative pusher, including a pushing mushrooms out of the holes with air pressure.

2. A combination of a device according to claim 1 and a filling station for mushroom containers, including trays, wherein the filling station comprises:

means including at least one container conveyor for providing mushroom containers, wherein the means convey the containers to a location below the twister, for catching mushrooms discharged from the mushroom conveyor.

3. The combination according to claim 2, wherein the means comprise multiple container conveyors, at a mutual distance in the transport direction, leading to different filling stations at various positions at the mushroom conveyor, wherein the pushers are controllable, such that mushrooms can be selectively removed from the mushroom conveyor at one filling station, while already having passed another filling station upstream.

4. The combination according to claim 3, wherein the selective removal is based on mushroom properties including size and weight, which is measured or otherwise determined at an upstream location.

5. The device according to claim 1, wherein the twister is configured to twist the mushroom conveyor about an axis parallel to direction of conveyance.

6. The device according to claim 5, wherein the axis coincides with the center or a side of the mushroom conveyor.

7. The device according to claim 1, wherein the angle wherein the ramp twists the conveyor is adjustable, and/or wherein the ramp is exchangeable.

8. The combination according to claim 4, wherein the means including the at least one container conveyor are configured for conveying the containers such that a bottom plane of the conveyors is under an angle with the horizontal plane.

9. The combination according to claim 4, wherein the means including at least one container conveyor are configured for moving the container with at least a directional component, or in a direction perpendicular to the direction of conveyance while catching mushrooms discharged from the mushroom conveyor.

10. The combination according to claim 4, wherein the means including at least one container conveyor extend from a destacker location where containers are destacked onto the means including at least one container conveyor, to a buffer location, where containers are stored for buffering.

11. The combination according to claim 10, comprising a second mushroom conveyor, extending from a second picking location to the buffer location.

12. The combination according to claim 11, wherein the buffer location comprises a check weigher.

* * * * *